United States Patent Office 2,948,740
Patented Aug. 9, 1960

2,948,740

2-HYDROXY-Δ¹,⁴-STEROIDS

John S. Baran, Chicago, Ill., assignor to G. D. Searle & Co., Chicago, Ill., a corporation of Delaware No Drawing. Filed Sept. 27, 1957, Ser. No. 686,594

7 Claims. (Cl. 260—397.4)

The present invention relates to a new group of hormonal agents with low androgenic activity and, more particularly, to 2-hydroxy-Δ¹,⁴-steroids variously substituted in the 17-position.

These compounds can be represented by the general formula

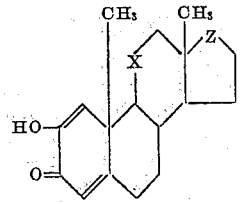

wherein X is a member of the class consisting of methylene, hydroxymethylene in which the hydroxy radical is in the β-position, and carbonyl groups and Z is a member of the class consisting of the carbonyl group and radicals of the formula

wherein A is a member of the class consisting of hydrogen, hydroxyl and (lower alkyl) —COO— groups and B is a member of the class consisting of lower alkyl, acetyl, hydroxyacetyl, (lower alkyl)

—COO—CH₂—CO— radicals, and, except in the case where A is hydrogen, a hydrogen radical. The lower alkyl radical of both groups referred to in the preceding sentence can be methyl, ethyl, straight-chained and branched propyl, butyl, pentyl, or hexyl.

The compounds of this invention have valuable pharmacological properties. They are anabolic agents, i.e. they promote nitrogen retention, and they produce this effect at a dosage which causes only a very low degree of androgenic activity. Another important field of utility of these compounds is their progestational effect, an effect which is not shared by the monounsaturated analogs, the 2-hydroxy-4-androstene derivatives. They are likewise useful in overcoming the hypertension produced by the mineralocorticoid hormone desoxycorticosterone.

These compounds are conveniently obtained by the selective oxidation of the corresponding Δ⁴-steroid in the 1-position with an oxidizing agent, e.g. selenious acid to give the seleno-1-dehydro derivative and the subsequent hydrolysis to the 2-hydroxy-1,4-androstadiene derivative. An alternative procedure is the selective oxidation of a 2α-hydroxy-Δ⁴-steroid in the 1-position using bismuth trioxide in the presence of acetic acid followed by dehydration.

This invention will appear in further detail from the following examples. However, the invention is not to be construed as limited by the details set forth in spirit or in scope. It will be apparent to those skilled in the art that numerous modifications of materials and methods can be practiced without departing from the invention. In these examples, temperatures are given in degrees centigrade (° C.) and relative amounts of materials in parts by weight.

Example 1

To a solution of 14 parts of testosterone in 240 parts of tertiary butyl alcohol containing 3 parts of acetic acid are added 6.5 parts of selenious acid. The mixture is refluxed with stirring for 5 hours. Then 2 more parts of selenious acid are added and the mixture is refluxed for 16 hours longer. The mixture is cooled, filtered, and the solvent is removed by vacuum distillation. The residue is taken up in 175 parts of methylene chloride, filtered, washed with water and then with several portions of aqueous sodium bicarbonate, and dried over anhydrous sodium sulfate. The organic solution is vacuum distilled. The residue is taken up in benzene and upon cooling and scratching, crystallization ensues. In this manner there is thus obtained seleno-1-dehydrotestosterone. The mother liquors are concentrated and chromatographed on silica gel with benzene. The column is developed with benzene solution containing increasing concentrations of ethyl acetate. On elution with a 25% solution of ethyl acetate in benzene, evaporation of the solvent and repeated recrystallization of the residue from an acetone-petroleum ether solution, there is thus obtained 2,17β-dihydroxy-1,4-androstadien-3-one melting at about 207–209° C. The optical rotation $\alpha_D$ of a chloroform solution is —20.1°.

Example 2

To a solution of 5 parts of 2α-hydroxytestosterone and 20 parts of acetic acid are added 3 parts of bismuth trioxide. The mixture is heated with stirring at 100° C. for 15 minutes. 3 additional parts of bismuth trioxide are added, and the heating continued for an additional 45 minutes. The mixture is then filtered and 200 parts of water and 200 parts of ethyl acetate are added to the filtrate. The organic layer is separated, washed with 150 parts of water, 75 parts of saturated aqueous sodium bicarbonate, dried over anhydrous sodium sulfate, and vacuum distilled. The residue is recrystallized from acetone. There is thus obtained 2,17β-dihydroxy-1,4-androstadien-3-one melting at approximately 208–210° C.

Example 3

To a solution of 2 parts of 2,17β-dihydroxy-1,4-androstadien-3-one in 1.5 parts of pyridine are added 0.5 part of acetic anhydride. The solution is warmed on a steam bath for 15 minutes, cooled to 0° C., and diluted with water. The needles which precipitate are filtered, washed with water, and dried. Upon recrystallization of the product from an ether-petroleum ether solution, there is thus obtained the diacetate of 2,17β-dihydroxy-1,4-androstadien-3-one melting at about 205–206° C.

Example 4

To a solution of 3 parts of 2α-hydroxyprogesterone in 12 parts of acetic acid are added 1.6 parts of bismuth trioxide. The mixture is heated for 15 minutes at 100° C. with stirring. Another portion of 1.6 parts of bismuth trioxide is added and the mixture is heated for an additional 45 minutes. The mixture is cooled, filtered and diluted slowly with swirling with 125 parts of water. Recrystallization from an acetone-petroleum ether solution gives 2-hydroxy-1,4-pregnadiene-3,20-dione melting at about 189–190° C. The rotation $\alpha_D$ in chloroform is +124°.

Example 5

To a solution of 4 parts of 17α-methyltestosterone in 400 parts of carbon tetrachloride are added 2.5 parts of N-bromosuccinimide. The mixture is refluxed with stirring under an infrared lamp for 45 minutes. The reaction mixture is then filtered and cooled to 0° C. The precipitated crystalline product is collected on a filter and washed with carbon tetrachloride. This product is refluxed for 4 hours with 12 parts of potassium acetate in 75 parts of acetic acid. The solution is then vacuum distilled and the residue is taken up in ethyl acetate and water. The organic layer is separated, washed with water and aqueous sodium bicarbonate, dried over anhydrous sodium sulfate, and vacuum distilled. Upon recrystallization from an acetone-petroleum ether solution there is obtained 2α-acetoxy-17α-methyltestosterone melting at about 199° C.

A solution of 1 part of 2α-acetoxy-17α-methyltestosterone in 6.4 parts of methanol is treated for 4 minutes under nitrogen with 11.2 parts of 1-M potassium hydroxide in methanol. Then 4.4 parts of 99% methanol are added. After 4 minutes the solution is acidified with 8 parts of 1.06 M acetic acid. The solution is vacuum distilled and the residue is taken up in ethyl acetate. The organic layer is washed with water, dried over anhydrous sodium sulfate, and vacuum distilled. The crystalline residue is dissolved in 6 parts of acetic acid and heated at 100° C. with 0.5 part of bismuth trioxide for 15 minutes. Another 0.4 part portion of bismuth trioxide is added and heating is continued for an additional 45 minutes. The mixture is filtered and the filtrate is taken up in ethyl acetate and water. The organic layer is separated, washed with water and aqueous sodium bicarbonate, dried over anhydrous sodium sulfate, and vacuum distilled. The residue is recrystallized from ether-petroleum ether solution to give 2,17β-dihydroxy-17α-methyl-1,4-androstadien-3-one melting at approximately 178–180° C., with the optical rotation $\alpha_D$ in chloroform solution of −32.9°.

Substitution of 4 parts of 17α-ethyltestosterone for 17α-methyltestosterone in the first part of this example yields 2,17β-dihydroxy-17α-ethyl-1,4-androstadien-3-one. The compound shows infrared maxima at 2.85, 3.01 and 6.10 microns.

Example 6

To a solution of 12 parts of 2β-hydroxytestosterone diacetate and 280 parts of methanol under nitrogen are added 60 parts of 1.01 M potassium hydroxide in methanol. After 4 minutes, 24 parts of methanol containing 3 parts of water are added. After another 4 minutes the solution is acidified with 43 parts of 1.06 N acetic acid. The solution is concentrated and cooled. The crystalline precipitate is filtered and washed with a small amount of methanol. To a solution of 3 parts of the hydrolysis product in 15 parts of acetic acid are added 2 parts of bismuth trioxide. The mixture is heated for 15 minutes at 100° C. with stirring. A further quantity of 2 parts of bismuth trioxide is added and the mixture is heated for 45 minutes longer. The mixture is cooled, filtered and diluted slowly with swirling with 125 parts of water. The precipitate is filtered and washed with water and aqueous sodium bicarbonate. Recrystallization of the product from an acetone-petroleum ether solution gives 2-hydroxy-17β-acetoxy-1,4-androstadien-3-one melting at approximately 193–195° C. The rotation $\alpha_D$ of a chloroform solution is +3.8°.

Example 7

To a solution of 4 parts of potassium in 24 parts of tertiary butyl alcohol are added 30 parts of 2,17β-dihydroxy-1,4-androstadien-3-one and 2.3 parts of methyl iodide. The solution is refluxed for ½ to 1 hour. The mixture is filtered and the filtrate is vacuum distilled. The residue is taken up in acetone, filtered, concentrated, diluted with ether-petroleum ether, and cooled. The precipitate is recrystallized from acetone. There is thus obtained 2-methoxy-17β-hydroxy-1,4-androstadien-3-one melting at about 226–227° C. The rotation $\alpha_D$ in chloroform is −34.8°.

Example 8

To a solution of 11 parts of 2α-hydroxy-4-androstene-3,17-dione in 50 parts of acetic acid is added 12 parts of bismuth trioxide. The mixture is heated at 100° C. with stirring for 30 minutes. Another 60 parts of bismuth trioxide is added and the mixture is heated for an additional 30 minutes. Then 1 part of charcoal is added and the mixture is filtered. The filtrate is diluted with 500 parts of water and extracted with chloroform. The organic layers are combined, washed with water and aqueous sodium bicarbonate, and dried over anhydrous sodium sulfate. The solvent is vacuum distilled, and the residue is recrystallized from ether-petroleum ether solution. Recrystallization of the compound from an acetone-petroleum ether solution yields 2-hydroxy-1,4-androstadien-3,17-dione melting at 157–158° C. The rotation $\alpha_D$ of a chloroform solution is +36°.

Example 9

A solution of 1.3 parts of desoxycorticosterone trimethylacetate and 0.5 part of N-bromosuccinimide in 400 parts of carbon tetrachloride is refluxed for 1 hour, cooled, and filtered. The filtrate is vacuum distilled at 50° C. The product is refluxed for 4 hours with 4 parts of potassium acetate in 120 parts of acetic acid. The solution is vacuum distilled and the residue is taken up in ethyl acetate and water. The organic layer is washed with water and aqueous sodium bicarbonate, dried over anhydrous sodium sulfate, and vacuum distilled. The product is recrystallized from an acetone-petroleum ether solution to yield 2α-acetoxy-21-trimethylacetoxy-4-pregnene-3,20-dione melting at about 227–229° C.

To a solution of 2 parts of 2α-acetoxy-21-trimethylacetoxy-4-pregnene-3,20-dione in 160 parts of methanol and 70 parts of dichloromethane under nitrogen are added 9 parts of 1.01 M potassium hydroxide in methanol. After 4 minutes, 3.6 parts of 99% methanol are added. After another 4 minutes the mixture is acidified with 6.5 parts of 1.06 M aqueous acetic acid. The solvent is then vacuum distilled and the solution is diluted with water. Recrystallization of the product from an acetone-petroleum ether solution yields 2α-hydroxy-21-trimethylacetoxy-4-pregnene-3,20-dione melting at about 221–223° C.

To a warm solution of 2 parts of 2α-hydroxy-21-trimethylacetoxy-4-pregnene-3,20-dione in 20 parts of acetic acid are added 1.3 parts of bismuth trioxide. The mixture is heated at 120° C. with stirring for 15 minutes and another 1.3 parts of bismuth trioxide are added. The mixture is heated for an additional 45 minutes, charcoal is added and the mixture is filtered. Upon dilution with a small amount of water and cooling, crystals precipitate. The product is filtered and washed with water. The precipitate is recrystallized from an acetone-petroleum ether solution to give 2-hydroxy-21-trimethylacetoxy-1,4-pregnadiene-3,20-dione melting at about 255–226° C. The rotation $\alpha_D$ in dioxane is +90°.

Substitution of 1.3 parts of desoxycorticosterone hexanoate for desoxycorticosterone trimethylacetate in the first part of this example yields 2α-hydroxy-21-hexanoyloxy-1,4-pregnadiene-3,20-dione. The compound shows infrared maxima at 2.90 and 6.10 microns.

Example 10

To a stirred refluxing mixture of 15 parts of 17α-hydroxy-21-trimethylacetoxy-4-pregnene-3,11,20-trione in 550 parts of chlorobenzene, 500 parts of carbon tetrachloride, and 35 parts of a 10% solution of pyridine in carbon tetrachloride there are added 6.5 parts of N-bromosuccinimide. The mixture is refluxed with stirring for 10 minutes under an infrared lamp. The organic solution is washed rapidly with warm water and dried over anhydrous sodium sulfate. The carbon tetrachloride and about 340 parts of chlorobenzene are vacuum distilled. The residual solution is diluted with petroleum ether and the precipitate is filtered, washed with carbon tetrachloride and petroleum ether and vacuum distilled. The product is refluxed with 56 parts of potassium acetate and 1400 parts of acetic acid for 4 hours. The solution is vacuum distilled and the residue taken up in ethyl acetate and water. The organic layer is washed several times with water and aqueous sodium bicarbonate, dried over anhydrous sodium sulfate and vacuum distilled. Upon recrystallization of the residue from methanol, there is obtained 2α-acetoxy-17α-hydroxy-21-trimethylacetoxy-4-pregnene-3,11,20-trione.

To a solution of 2 parts of 2α-acetoxy-17α-hydroxy-21-trimethylacetoxy-4-pregnene-3,11,20-trione in 12 parts of methanol in 14 parts dichloromethane under nitrogen there are added 5 parts of 0.8 M potassium hydroxide in methanol. After 4 minutes 3.2 parts of 99% methanol are added. The product begins to separate during the reaction period. After 30 minutes, the mixture is acidified with 6.3 parts of 1 M acetic acid. The precipitate is filtered and washed with water. Upon recrystallization from acetone there is obtained 2α,17α-dihydroxy-21-trimethylacetoxy-4-pregnene-3,11,20-trione melting at about 276–278° C.

To a warm solution of 1 part of 2α,17α-dihydroxy-21-trimethylacetoxy-4-pregnene-3,11,20-trione in 75 parts of acetic acid are added 1.1 parts of bismuth trioxide. The mixture is heated at 100° C. with stirring for 15 minutes and then another 1.1 parts of bismuth trioxide are added. After heating for an additional 45 minutes, charcoal is added and the mixture is filtered. Upon dilution with a small amount of water and cooling, crystals precipitate. The product is chromatographed on silica gel. The column is developed with benzene solutions containing increasing concentrations of ethyl acetate. The desired product is eluted with a 15% ethyl acetate in benzene solution and recrystallized from an acetone-petroleum ether solution. In this manner there is thus obtained 2,17α-dihydroxy - 21 - trimethylacetoxy-1,4-pregnadiene-3,11,20-trione melting at approximately 263–265° C. The rotation α_D in dioxane is +161°.

Example 11

A solution of 1.3 parts of 17α-hydroxydesoxycorticosterone-21-benzoate and 0.5 part of N-bromosuccinimide in 400 parts of carbon tetrachloride is refluxed for 1 hour, cooled, and filtered. The filtrate is vacuum distilled at 50° C. The residue is refluxed for 4 hours with 4 parts of potassium acetate and 120 parts of acetic acid. The solution is vacuum distilled and the residue taken up in ethyl acetate and water. The organic layer is washed with water and aqueous sodium bicarbonate, dried over anhydrous sodium sulfate, and vacuum distilled. The product is recrystallized from an acetone-petroleum ether solution.

To a solution of 2 parts of 2α-acetoxy-17α-hydroxy-desoxycorticosterone 21-benzoate thus obtained in 160 parts of methanol and 55 parts of dichloromethane in nitrogen are added 9 parts of 1 M potassium hydroxide in methanol. After 4 minutes, 3.6 parts of 99% methanol are added. After another 4 minutes the mixture is acidified with 6.5 parts of 1.06 M aqueous acetic acid. The dichloromethane is then vacuum distilled and the residual solution is diluted with water. Upon recrystallization from an acetone-petroleum ether solution there is obtained 2α,17α-dihydroxydesoxycorticosterone 21-benzoate.

To a warm solution of 2 parts of 2α,17α-dihydroxydesoxycorticosterone 21-benzoate and 20 parts of acetic are added 1.3 parts of bismuth trioxide. The mixture is heated at 100° C. with stirring for 15 minutes, and then another 1.3 part portion of bismuth trioxide is added and heating is continued for an additional 45 minutes. Charcoal is added and the mixture is filtered. Upon dilution with a small amount of water and cooling, crystals precipitate. The product is filtered, washed with water, and recrystallized from an acetone petroleum ether solution to give 2,17α-dihydroxy-1,4-pregnadiene-3,20-dione 21-benzoate.

To a solution of 2 parts of 2,17α-dihydroxy-1,4-pregnadiene-3,20-dione 21-benzoate in 160 parts of methanol and 55 parts of dichloromethane in nitrogen are added 9 parts of 1 M potassium hydroxide in methanol. The mixture is let stand at room temperatures for several hours, and 3.6 parts of 99% methanol are added. The mixture is then acidified with 6.5 parts of 1.06 M aqueous acetic acid. The dichloromethane is vacuum distilled and the residual solution is diluted with water. Upon recrystallization from an acetone-petroleum ether solution there is obtained 2,17α,21-trihydroxy-1,4-pregnadiene-3,20-dione.

One part of the 2,17α,21-trihydroxy-1,4-pregnadiene-3,20-dione is stirred with 5000 parts of citrated beef blood and 5000 parts of 0.85% aqueous sodium chloride solution. This solution is perfused 3 times through a surviving beef adrenal, which is cannulated through the vein and has a finely lacerated surface. The perfusate is then extracted with isopropyl acetate. This extract is dried by azeotropic distillation and then concentrated to a residue of about 20 parts. After dilution with about 400 parts of benzene the solution is poured into a chromatography column containing silica gel. The column is developed with benzene solutions containing increasing concentrations of ethyl acetate. Elution with a 40% solution of ethyl acetate and benzene and concentration of the eluate yields 2,11β,17α,21-tetrahydroxy-1,4-pregnadiene-3,20-dione. The product shows infrared maxima at 2.90, 5.83, and 6.10 microns and a broad band at 2.97 microns.

Example 12

To a solution of 2 parts of 2,17β-dihydroxy-1,4-androstadien-3-one in 1.5 parts of pyridine are added 0.5 part of propionic anhydride. The solution is warmed on a steam bath for 15 minutes, cooled to 0° C., and diluted with water. The needles which precipitate are filtered, washed with water, and dried. Upon recrystallization of the product from an ether-petroleum ether solution there is thus obtained the dipropionate of 2,17β-dihydroxy-1,4-androstadien-3-one.

Twelve parts of the 2β - hydroxytestosterone dipropionate in 280 parts of methanol under nitrogen are substituted in the procedure of Example 6 to yield 2-hydroxy-17β-propionoxy-1,4-androstadien-3-one.

What is claimed is:
1. A compound of the structural formula

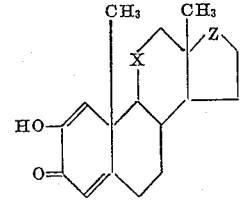

wherein X is a member of the class consisting of methylene and carbonyl groups and the hydroxymethylene group in which the hydroxyl radical is in the β-position and Z is a member of the class consisting of the carbonyl group and radicals of the formula >CH—OH, >CH—O—CO—(lower alkyl), >CH—COCH₃,
>C(lower alkyl)—OH, >CH—CO—CH₂—O—CO—(lower alkyl),
and >C(OH)—CO—CH₂OH 2. A compound of the structural formula

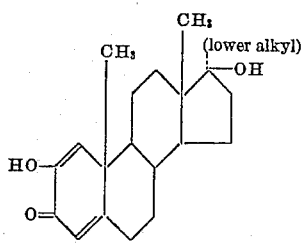

3. 2,17β - dihydroxy - 17α - methyl - 1,4 - androstadien-3-one.
4. 2,17β-dihydroxy-1,4-androstadien-3-one.
5. 2-hydroxy-1,4-pregnadiene-3,20-dione.
6. 2,11β,17α,21 - tetrahydroxy - 1,4 - pregnadiene - 3,20-dione.
7. 2,17α,21 - trihydroxy - 1,4 - pregnadiene - 3,11,20 - trione.

References Cited in the file of this patent
UNITED STATES PATENTS

| | | |
|---|---|---|
| 2,748,150 | Bergstrom | May 29, 1956 |
| 2,783,226 | Gould et al. | Feb. 26, 1957 |
| 2,805,231 | Dodson et al. | Sept. 3, 1957 |

OTHER REFERENCES

Rosenkranz et al.: J.A.C.S. 77, 145–148 (1955).
Camerino et al.: J.A.C.S. 78, 3540–1 (1956).